United States Patent
Miyazaki

(10) Patent No.: US 12,366,796 B2
(45) Date of Patent: Jul. 22, 2025

(54) LIGHT SOURCE DEVICE AND PROJECTION DEVICE

(71) Applicant: CASIO COMPUTER CO., LTD., Tokyo (JP)

(72) Inventor: Takeshi Miyazaki, Fussa (JP)

(73) Assignee: CASIO COMPUTER CO., LTD., Tokyo (JP)

(*) Notice: Subject to any disclaimer, the term of this patent is extended or adjusted under 35 U.S.C. 154(b) by 364 days.

(21) Appl. No.: 17/949,946

(22) Filed: Sep. 21, 2022

(65) Prior Publication Data

US 2023/0088006 A1    Mar. 23, 2023

(30) Foreign Application Priority Data

Sep. 22, 2021   (JP) ................................ 2021-154544

(51) Int. Cl.
G03B 21/20    (2006.01)

(52) U.S. Cl.
CPC ....... *G03B 21/204* (2013.01); *G03B 21/2066* (2013.01); *G03B 21/208* (2013.01)

(58) Field of Classification Search
None
See application file for complete search history.

(56) References Cited

U.S. PATENT DOCUMENTS

2006/0018609 A1* 1/2006 Sonoda ............... G02B 6/4204
385/94

FOREIGN PATENT DOCUMENTS

CN    105467737 A *  4/2016
JP        6145194 B2   5/2017

* cited by examiner

*Primary Examiner* — Bao-Luan Q Le
*Assistant Examiner* — Danell L Owens
(74) *Attorney, Agent, or Firm* — Fitch, Even, Tabin & Flannery LLP

(57) ABSTRACT

A light source device includes a laser diode, a focusing mirror, a focusing lens, and an optical fiber. The laser diode emits a laser beam having a divergence angle in a first axial direction of a first axis perpendicular to an optical axis larger than a divergence angle in a second axial direction of a second axis perpendicular to the optical axis and the first axis. The focusing mirror reflects the laser beam emitted from the laser diode and focuses the laser beam in the first axial direction. The focusing lens focuses the laser beam reflected by the focusing mirror in the second axial direction. The optical fiber has a core that the laser beam focused by the focusing mirror and the focusing lens enters.

8 Claims, 8 Drawing Sheets

LIGHT SOURCE DEVICE AND PROJECTION DEVICE

CROSS-REFERENCE TO RELATED APPLICATIONS

The present application is based upon and claims the benefit of priority from Japanese Patent Application No. 2021-154544 filed on Sep. 22, 2021, whose descriptions, claims, abstracts, and drawings are incorporated herein by reference in its entirety.

BACKGROUND OF THE INVENTION

Field of the Invention

The present disclosure relates to a light source device and a projection device.

Description of the Related Art

Conventionally, there is known an optical system in which a laser beam emitted from a laser diode is focused and enters a core of an optical fiber. This optical system includes a mirror that reflects the laser beam in a direction toward the core of the optical fiber, and a focusing lens that focuses the laser beam reflected by the mirror so that it enters the core (for example, see JP 6145194 B2).

The laser beam emitted from the laser diode has a cross-section perpendicular to the optical axis that is elliptical in shape having two axes: a first axis having a large beam divergence angle and a second axis having a small beam divergence angle. JP 6145194 B2 discloses a technique to make the elliptical laser beam enter the core with high coupling efficiency by providing a first focusing lens that focuses the laser beam in the first axial direction and a second focusing lens that focuses the laser beam in the second axial direction separately along the optical axis in the above optical system.

SUMMARY OF THE INVENTION

According to an aspect of the present disclosure, there is provided a light source device including:

a laser diode that emits a laser beam having a divergence angle in a first axial direction of a first axis perpendicular to an optical axis larger than a divergence angle in a second axial direction of a second axis perpendicular to the optical axis and the first axis;

a focusing mirror that reflects the laser beam emitted from the laser diode and focuses the laser beam in the first axial direction;

a focusing lens that focuses the laser beam reflected by the focusing mirror in the second axial direction; and an optical fiber that has a core that the laser beam focused by the focusing mirror and the focusing lens enters.

DETAILED DESCRIPTION OF THE PREFERRED EMBODIMENTS

Hereinafter, embodiments of the present disclosure will be described with reference to the drawings.

<Configuration of Projector>

Figure 1:
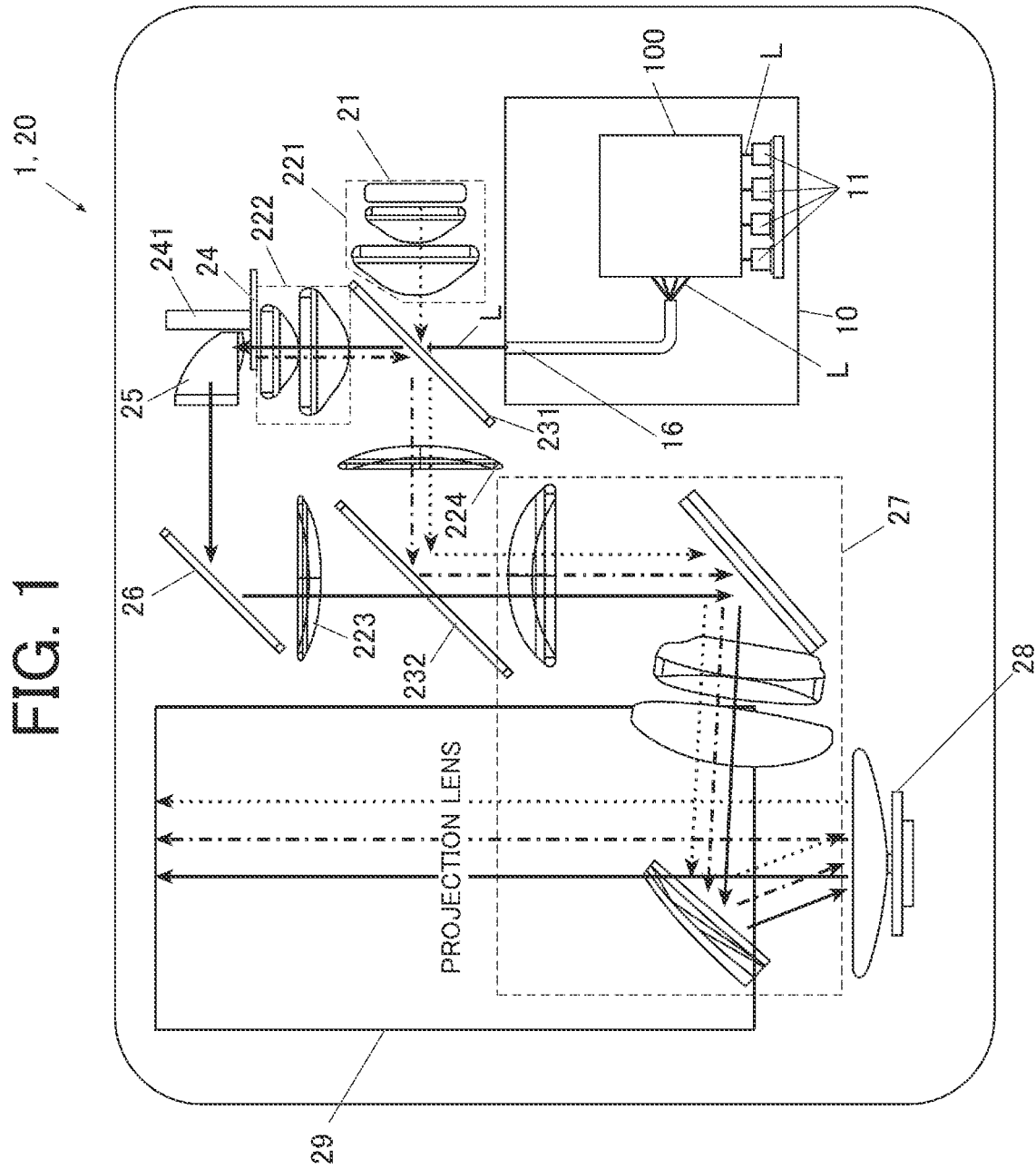
FIG. 1 is a diagram illustrating a configuration of a projector having a light source device and light paths.

FIG. 1 illustrates a configuration of a projector 1 having a light source device 10 of the present embodiment and light paths therein. The projector 1 (projection device) has a light source device 10 that outputs a laser beam(s) L and a light emitting diode 21 (hereinafter referred to as "LED 21"). The projector 1 forms an image using at least the light source device 10 and RGB light from the LED 21 as a light source and projects the image onto a projection surface. FIG. 1 shows extracted components of the projector 1 including the light source device 10 and the image projector 20 that forms and projects the image. The components of FIG. 1 except the light source device 10 constitute the image projector 20.

The light source device 10 emits a laser beam in a blue wavelength band (hereinafter referred to as "blue beam") from an emission end surface of the optical fiber 16. The blue beam is emitted from a plurality of laser diodes 11 (hereinafter referred to as "LDs 11") and enters the optical fiber 16. The light source device 10 also has an optical system 100 that guides the laser beams L emitted from the LDs 11 into the optical fiber 16. The beam in a green wavelength band (hereinafter referred to as "green beam") is obtained by illumination of a phosphor layer of a phosphor wheel 24 with a portion of the blue beam emitted from the light source device 10. The LED 21 emits a beam(s) in a red wavelength band (hereinafter referred to as "red beam(s)"). In FIG. 1, light paths of the blue beam are indicated by solid lines, light paths of the green beam are indicated by dash-dotted lines, and light paths of the red beam are indicated by dashed lines.

Various optical devices are placed on the optical paths. Here, the optical devices include lens groups 221, 222, lenses 223, 224, dichroic filters 231, 232, a phosphor wheel 24, an irregularly shaped lens 25, a reflection mirror 26, a merging light guide 27, a display element 28, and a projection lens 29.

Among these, the phosphor wheel 24 is placed on the light path of the blue beam and is rotated by a motor 241. The phosphor wheel 24 is a circular metal plate having a region with a phosphor layer and a diffusion-transmission surface. The blue beam emitted from the light source device 10 and passing through the dichroic filter 231 and the lens group 222 enters the phosphor wheel 24. This blue beam partly passes through the diffusion-transmission surface of the phosphor wheel 24. The rest of the blue beam illuminate the phosphor layer of the phosphor wheel 24, and the green beam excited in response to the illumination travels in a direction opposite to the direction in which the blue beam travels.

The blue beam passing through the phosphor wheel 24 enters the irregular-shaped lens 25 and is further guided through the reflection mirror 26, the lens 223, and the dichroic filter 232 to the merging light guide 27.

The green beam emitted from the phosphor layer of the phosphor wheel 24 returns to the lens group 222, is reflected by the dichroic filter 231, passes through the lens 224, is reflected by the dichroic filter 232, and is guided to the merging light guide 27.

The red beam emitted from the LED 21 passes through the dichroic filter 231 after its diffusion is narrowed by the lens group 221, is reflected by the dichroic filter 232, and is led to the merging light guide 27.

After the beams of the three colors are combined (merged) at the dichroic filter 232, these beams are emitted through the merging light guide 27, the display element 28, and the projection lens 29. The merging light guide 27 reflects the merged collimated beams of respective colors and guides them to the display element 28 in an appropriate direction.

The display element 28 is a spatial optical modulator (SOM), for example, a digital micromirror device (DMD). The DMD switches tilt angles of a plurality of micro mirrors arranged in an array individually and at high speed according to pixel values of image data, determines whether or not light is reflected to the projection lens 29 on a pixel-by-pixel and image frame-by-frame basis, and forms a light image (image) by the reflected light.

The projection lens 29 guides and emits the light image emitted from the display element 28 in a predetermined output direction. The projection lens 29 may include a plurality of lenses, such that the focal length and magnification ratio (zoom magnification) of the output image can be adjusted by changing the positional relationship of the plurality of lenses.

In this way, in the projector 1, the laser beam L in the blue wavelength band output from the light source device 10 are used partly as a blue beam as it is, and partly converted to a green beam, and used for image projection. Instead of LED 21 as the red beam source, a light source device 10 that outputs a laser beam in the red wavelength band may be used. A light source device 10 that outputs a laser beam in the green wavelength band may also be provided, and a laser beam output from the light source device 10 may be used as the green beam. The light source device 10 may be provided outside the housing of the projector 1. That is, the optical fiber 16 of the light source device 10 may be connected to the housing of the projector 1, and the laser beam output from the LD 11 that is placed outside the housing may be introduced into the housing of the projector 1 via the optical fiber 16.

<Configuration of Light Source Device>

Figure 2:
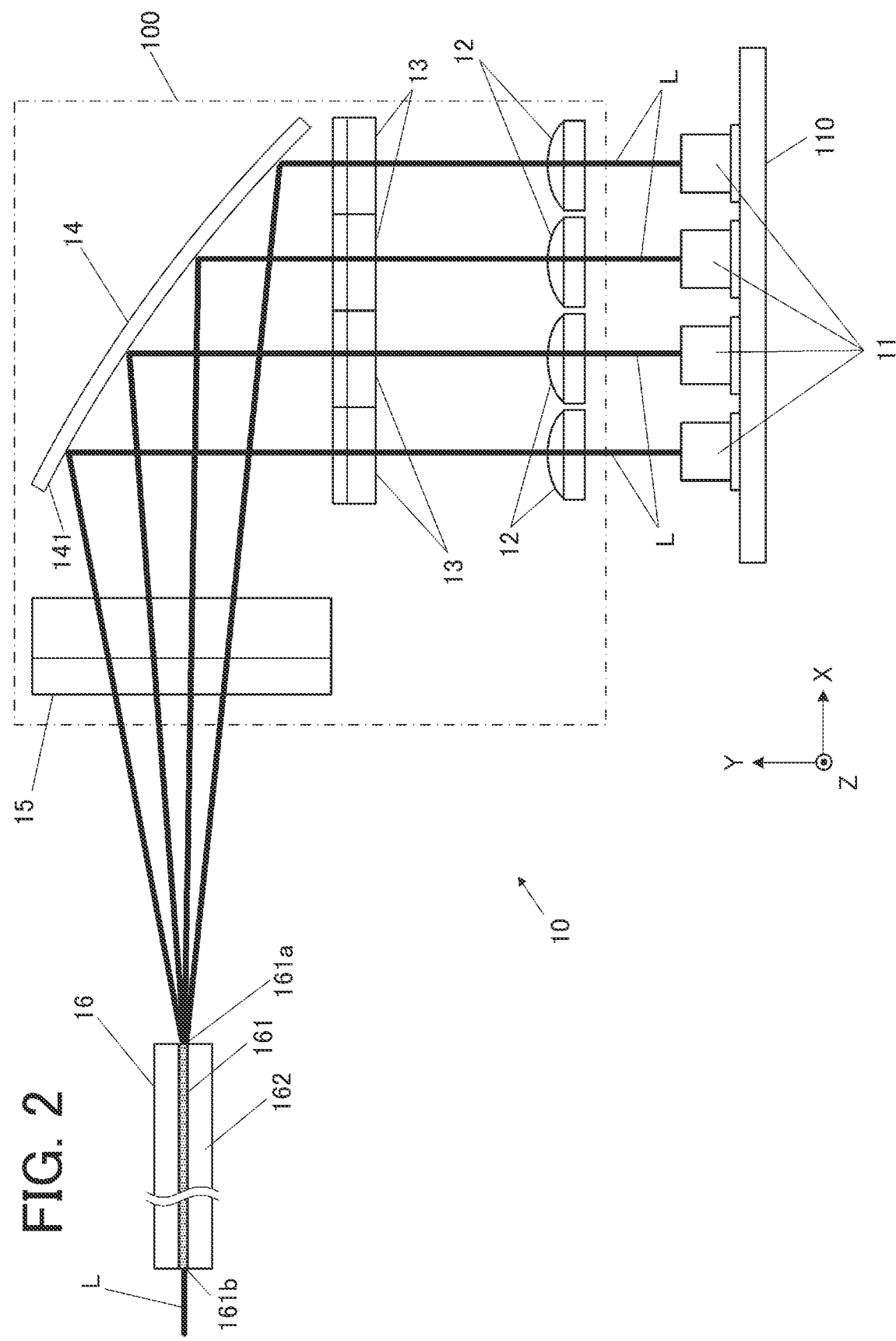
FIG. 2 is a schematic diagram showing a configuration of the light source device.

Hereinafter, with reference to FIGS. 2 to 8, configurations of the light source device 10 will be explained. FIG. 2 is a schematic diagram showing a configuration of the light source device 10. The light source device 10 includes a plurality of LDs 11, first collimator lenses 12, second collimator lenses 13, a focusing mirror 14, a focusing lens 15, and an optical fiber 16. Among these, the first collimator lenses 12, the second collimator lenses 13, the focusing mirror 14, and the focusing lens 15 constitute an optical system 100 that guides the laser beams L emitted from the plurality of LDs 11 to an incident end surface 161a of a core 161 of the optical fiber 16. In other words, the light source device 10 uses the optical system 100 described above to guide the laser beams L emitted from the plurality of LDs 11 to the incident end surface 161a of the core 161 of the optical fiber 16 and emits the laser beams L from the emission end surface 161b of the core 161 of the optical fiber 16. FIG. 2 schematically shows a positional relationship of the LDs 11, the first collimator lenses 12, the second collimator lenses 13, the focusing mirror 14, the focusing lens 15, and the optical fiber 16 of the light source device 10, and the size and mutual distance of each of these components are adjusted according to specific embodiments (the same applies to FIGS. 3 to 9 below).

The optical fiber 16 has the core 161 passing through its central shaft, and a clad 162 that covers the side surface of the core 161. The refractive index of the core 161 is larger than that of the clad 162. As a result, the laser beam(s) L entering the core 161 from the incident end surface 161a of the core 161 at an incident angle less than a maximum light-receiving angle represented by a Numerical Aperture (NA) travels inside the core 161 while being totally reflected at the interface between the core 161 and the clad 162. The beam that enters the core 161 at an incident angle larger than the maximum light-receiving angle is not totally reflected but leaks out of the core 161 and lost. Such loss of beam due to the large incident angle is hereinafter referred to as "incident angle loss". The beam that enters the end surface of the optical fiber 16 outside the incident end surface 161a of the core 161 does not enter inside of the core 161 and is therefore lost. Such loss of beam due to the incident position being out of the incident end face 161a of the core 161 is hereinafter referred to as "incident position loss". By using the optical fiber 16, a beam with a uniform light intensity distribution and small etendue can be taken out from the emission end surface 161b of the optical fiber 16, which realizes simple configuration and high efficiency of the projector 1.

The plurality of LDs 11 in an array of four rows in an X direction and two rows in a Z direction are fixed on a board parallel to an X-Z plane of the substrate 110 and form an LD-Bank. Therefore, the light source device 10 of the present embodiment has a total of eight LDs 11. Each of the LDs 11 is, for example, mounted in a TO-CAN-type package. The optical axes La of the laser beams L emitted from the respective LDs 11 are parallel to the Y-direction, and are parallel to each other.

Figure 3:
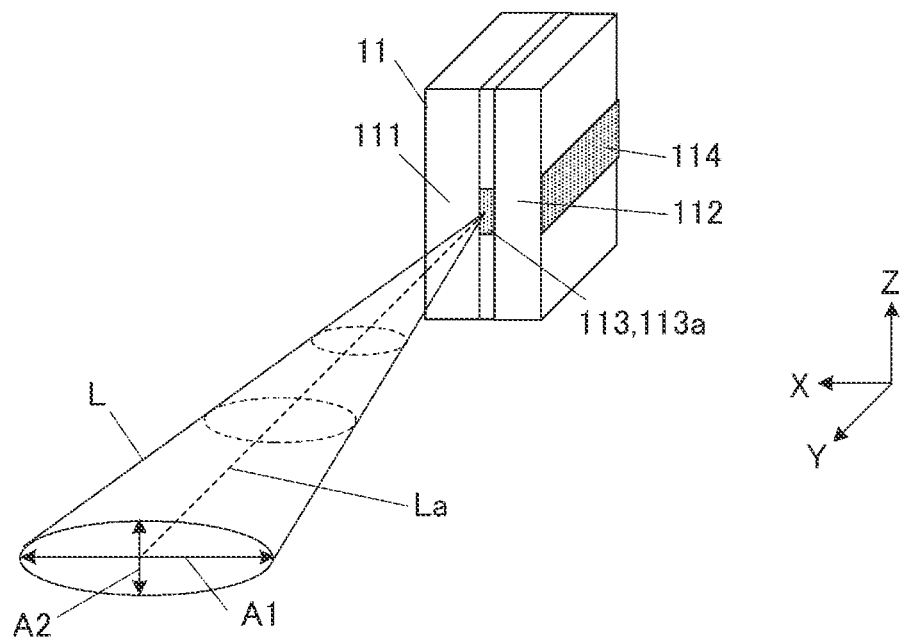
FIG. 3 shows a structure of the laser diode and a shape of a laser beam emitted from the laser diode.

FIG. 3 shows a structure of the LD 11 and the shape of the spread of the laser beam L emitted from the LD 11. The LD 11 has a double heterostructure having an n-type clad layer 111, a p-type clad layer 112, and an active layer 113 (light-emitting layer) between the n-type clad layer 111 and the p-type clad layer 112. When voltage is applied to an electrode 114, electrons and holes combine in the active layer 113 to emit light, and resonance between the end surfaces of the active layer causes induced emission and laser oscillation. The oscillated laser beam is emitted from a luminous end surface 113a, one of the end surfaces of the active layer 113, in the Y direction in FIG. 3.

The laser beam L emitted from the LD 11 has a cross-section perpendicular to the optical axis La that is elliptical in shape having two axes: a fast axis A1 (first axis) having a large beam divergence angle (in other words, the beam spreads rapidly) and a slow axis A2 (second axis) having a small beam divergence angle (in other words, the beam spreads slowly). In other words, the LD 11 emits the laser beam L having a larger beam divergence angle in the fast axial A1 direction perpendicular to the optical axis La than the beam divergence angle in the slow axial A2 direction perpendicular to the optical axis La and the fast axis A1. The fast axis A1 is parallel to the stacking direction of the n-type clad layer 111, the active layer 113, and the p-type clad layer 112, that is, parallel to the X direction in FIG. 3. The slow axis A2 is perpendicular to the optical axis La and the slow axis A2, that is, parallel to the Z direction in FIG. 3. The directions of the fast axis A1 and the slow axis A2 are not fixed in spatial coordinates, but are determined depending on the direction of the optical axis La. For example, when the laser beam L shown in FIG. 3 is reflected by a mirror and travels in the −X direction, the direction of the optical axis La changes by 90 degrees, the fast axis A1 is parallel to the Y direction, and the slow axis A2 remains parallel to the Z direction.

In the present embodiment, the dimension of the luminous end surface 113a in the fast axial A1 direction is about 1 μm, and the dimension in the slow axial A2 direction is about 50 μm. The divergence angle of the laser beam L in the fast axial A1 direction is about ±23 degrees with respect to the optical axis La, and the divergence angle of the laser beam L in the slow axial A2 direction is about ±5 degrees with respect to the optical axis La. However, the dimensions of the luminous end surface 113a and the divergence angle of the laser beam L are examples and are not limited to the above values.

Due to the small dimension of the luminous end surface 113a in the fast axial A1 direction, the fast axial A1 direction component of the laser beam L has a small variation in the traveling direction (the traveling direction is oriented). On the other hand, due to the large dimension of the luminous end surface 113a in the slow axial A2 direction, the slow axial A2 direction component of the laser beam L has a large variation of the traveling direction.

In the light source device 10 of the present embodiment, considering that variations in the divergence angle and the traveling direction of the laser beam L differ between the fast axis A1 and the slow axis A2, the optical system 100 is configured such that the incident angle loss and the incident position loss described above can be sufficiently reduced for each of the fast axial A1 direction component and the slow axial A2 direction component of the laser beam L. Hereinafter, a configuration of the optical system 100 will be explained below.

As shown in FIG. 2, the laser beam L emitted from each of the LDs 11 enters the first collimator lens 12 and the second collimator lens 13 in that order.

Figure 4:
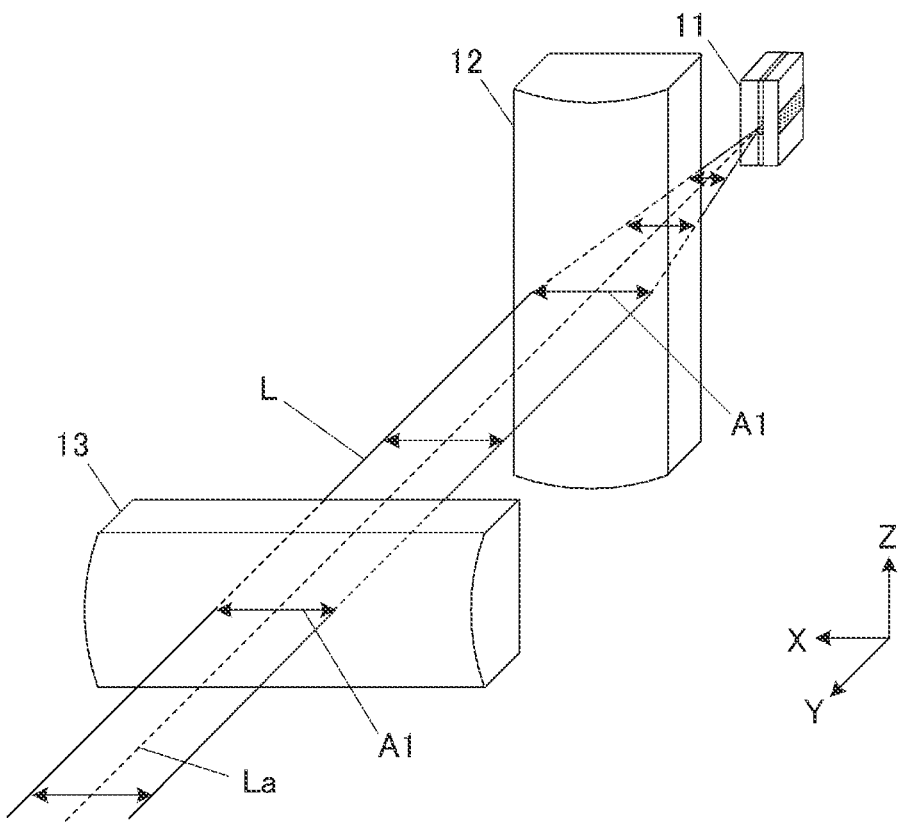
FIG. 4 illustrates a collimating effect in a fast axial direction by a first collimator lens and a second collimator lens.
Figure 5:
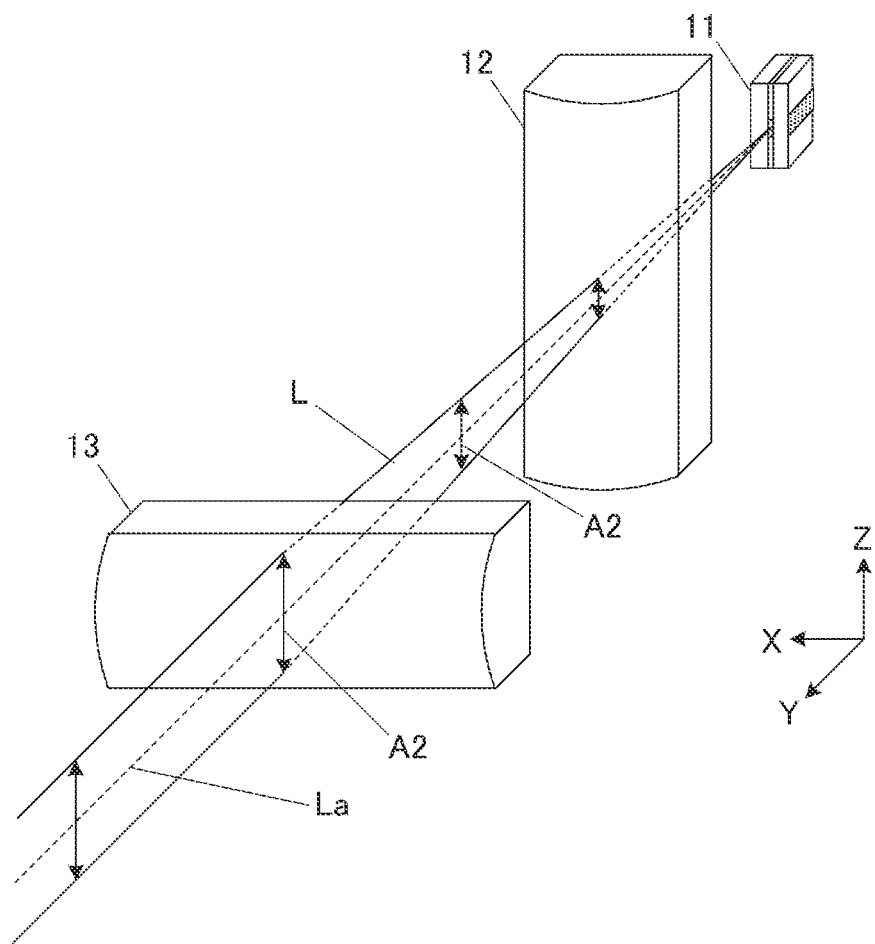
FIG. 5 illustrates a collimating effect in a slow axial direction by a first collimator lens and a second collimator lens.

FIGS. 4 and 5 illustrate structures of the first collimator lens 12 and the second collimator lens 13 and a collimating effect on the laser beam L. The first collimator lens 12 collimates the laser beam L having been emitted from the LD 11 and before entering the focusing mirror 14 in the fast axial A1 direction. The second collimator lens 13 collimates the laser beam L having passed through the first collimator lens 12 and before entering the focusing mirror 14 in the slow axial A2 direction. Here, "collimating in the fast axial A1 direction" means that the laser beam L traveling with diffusion in the fast axial A1 direction is refracted so as to be parallel to the optical axis La in a plane parallel to the fast axis A1 and the optical axis La. "Collimating in the slows A2 direction" means that the laser beam L traveling with diffusion in the slow axial A2 direction is refracted so as to be parallel to the optical axis La in a plane parallel to the slow axis A2 and the optical axis La.

As shown in FIG. 4, the first collimator lens 12 is a cylindrical lens having a curvature in the fast axial A1 direction and a cylinder axis (generatrix) in the slow axial A2 direction. Specifically, the first collimator lens 12 has an incident surface perpendicular to the optical axis La of the laser beam L (that is, parallel to the X-Z plane) and an exit surface in the form of a cylindrical surface opposite to the incident surface. The exit surface of the first collimator lens 12 is curved so as to have a cross-section parallel to an X-Y plane protruding in the +Y direction and a straight cross-section parallel to a Y-Z plane. The first collimator lens 12 with such a structure collimates the laser beam L in the fast axial A1 direction without having the collimating effect on the laser beam L in the slow axial A2 direction. The first collimator lens 12 is arranged such that the distance between a predetermined portion in the first collimator lens 12 and the LD 11 is the focal length of the first collimator lens 12.

As shown in FIG. 5, the second collimator lens 13 is a cylindrical lens having a curvature in the slow axial A2 direction and a cylinder axis in the fast axial A1 direction. Specifically, the second collimator lens 13 has an incident surface perpendicular to the optical axis La of the laser beam L (that is, parallel to the X-Z plane) and an exit surface in the form of a cylindrical surface opposite to the incident surface. The exit surface of the second collimator lens 13 is curved so as to have a cross-section parallel to the Y-Z plane protruding in the +Y direction and a straight cross-section parallel to the X-Y plane. The second collimator lens 13 with such a structure collimates the laser beam L in the slow axial A2 direction but does not have the collimating effect on the laser beam L in the fast axial A1 direction. The second collimator lens 13 is arranged such that the distance between a predetermined portion in the second collimator lens 13 and the LD 11 is the focal length of the second collimator lens 13. The focal length of the second collimator lens 13 is longer than the focal length of the first collimator lens 12. The second collimator lens 13 is arranged farther from the LD 11 than the first collimator lens 12 is.

With reference to FIG. 4, the collimating effect in the fast axial A1 direction by the first collimator lens 12 and the second collimator lens 13 will be explained. In FIG. 4, the component of the laser beam L in the fast axial A1 direction is extracted and illustrated. The fast axial A1 direction component of the laser beam L emitted from the LD 11 enters the first collimator lens 12 with diffusion within the divergence angle described above, is refracted by the first collimator lens 12, and exits the first collimator lens 12 as collimated beam parallel to the optical axis La. The fast axial A1 direction component of the laser beam L exiting the first collimator lens 12 then enters the second collimator lens 13 and passes through the second collimator lens 13 as collimated beam.

With reference to FIG. 5, the collimating effect in the slow axial A2 direction by the first collimator lens 12 and the second collimator lens 13 will be explained. In FIG. 5, the slow axial A2 direction component of the laser beam L is extracted and illustrated. The slow axial A2 direction component of the laser beam L emitted from the LD 11 enters the first collimator lens 12 with diffusion within the divergence angle described above, and passes through the first collimator lens 12 as it is without being collimated. The slow axial A2 direction component of the laser beam L exiting the first collimator lens 12 then enters the second collimator lens 13 with further diffusion, is refracted by the second collimator lens 13, and exits the second collimator lens 13 as collimated beam parallel to the optical axis La.

In this way, by providing the first collimator lens 12 and the second collimator lens 13 having collimating effects respectively on the fast axial A1 direction and the slow axial A2 direction, the laser beam L that diffuses elliptically can be effectively collimated.

As shown in FIG. 2, the laser beam L collimated by the first collimator lens 12 and the second collimator lens 13 enters the focusing mirror 14.

Figure 6A:
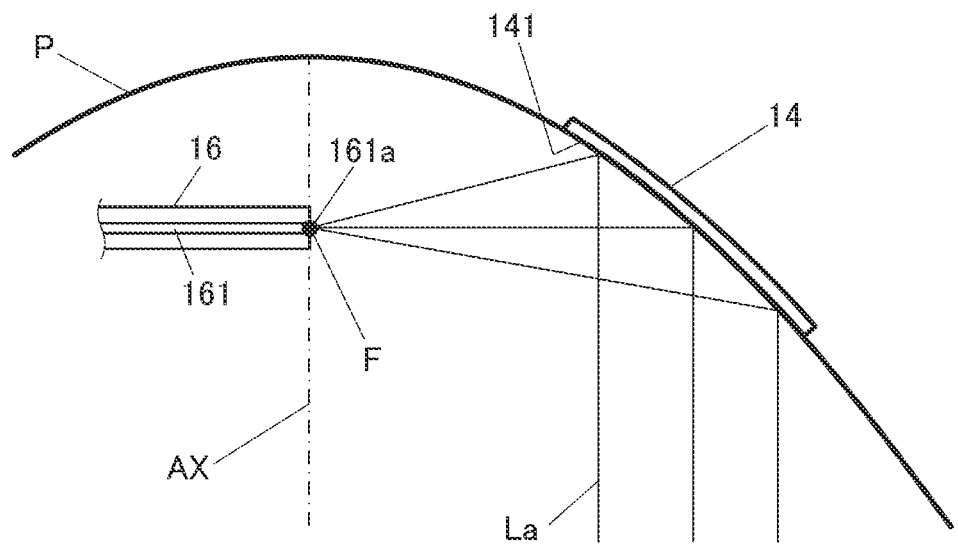
FIG. 6A illustrates a shape of a focusing mirror.
Figure 6B:
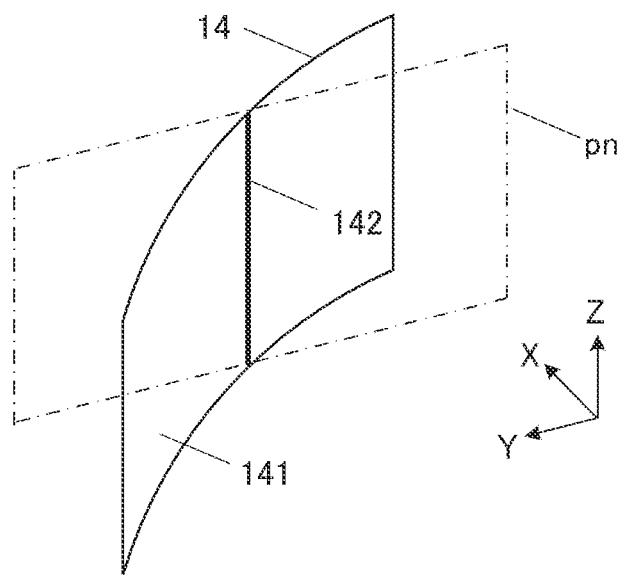
FIG. 6B illustrates a shape of a focusing mirror.

FIGS. 6A and 6B illustrate the shape of the focusing mirror 14. FIG. 6A illustrates a shape and a focusing effect of the focusing mirror 14 as seen from the Z direction. FIG. 6B is a schematic diagonal view of the shape of the focusing mirror 14. The focusing mirror 14 reflects the laser beam L emitted from the LD 11 and collimated by the first collimator lens 12 and the second collimator lens 13 and focuses the laser beam L in the fast axial A1 direction. Here, "focusing the laser beam L in the fast axial A1 direction" means focusing the laser beam particularly in the fast axial A1 direction, for example, focusing the laser beam L only in the fast axial A1 direction. Here, "focusing the laser beam L only in the fast axial A1 direction" means that the focusing mirror 14 is designed to focus the laser beam L not in the slow axial A2 direction but in the fast axial A1 direction, however, the focusing mirror 14 may have a slight focusing effect (refraction effect) in the slow axial A2 direction due to manufacturing variations in the focusing mirror 14. The focusing mirror 14 has a reflection surface 141 that is a parabolic columnar surface, having a partial parabola shape in a first plane that is parallel to the optical axis La and the fast axis A1 (here, in the X-Y plane) as shown in FIG. 6A and a linear shape 142 in a second plane that is perpendicular to the first plane (here, for example, in a plane pn parallel to the Y-Z plane) as shown in FIG. 6B. The partial parabola shape corresponds to a portion of a certain hypothetical parabola P in the first plane and does not cross an axis AX of the parabola P. From another point of view, the reflection surface 141 of the focusing mirror 14 is a curved surface formed by a locus of the partial parabola P that does not cross the axis AX moved in the Z direction. Since not crossing the axis AX of the parabola P, the reflection surface 141 of the focusing mirror 14 may be referred to as an "off-axis parabolic columnar surface." Thus, the focusing mirror 14 may be referred to as a "parabolic columnar surface mirror" or an "off-axis parabolic columnar surface mirror." Alternatively, the focusing mirror 14 may be referred to as an "Off-Axis Parabolic Cylindrical Mirror (OAPCM)."

The focusing mirror 14 is arranged so that the optical axis La of the laser beam L entering the reflection surface 141 is parallel to the axis AX of the parabola P. Therefore, as shown in FIG. 6A, the laser beam L entering the reflection surface 141 is reflected by the reflection surface 141 and focused into the focal point F of the parabola P. The incident end surface 161a of the core 161 of the optical fiber 16 is arranged at a position corresponding to the focal point F of the parabola P when viewed from a direction perpendicular to the X-Y plane (first plane). According to such arrangement, the focusing mirror 14 can focus the fast axial A1 direction component of the laser beam L into the incident end surface 161a of the core 161. However, when the focusing position of the fast axial A1 direction component shifts from the focal point F due to refraction at the focusing lens 15 described later, the position of the incident end surface 161a of the core 161 may be adjusted by taking the shift into account. The above "position corresponding to the focal point F of the parabola P" includes the position after the adjustment taking the above shift into account.

As shown in FIG. 2, the laser beams L emitted from the plurality of LDs 11 whose positions in the fast axial A1 direction (X direction) are different from each other enter the reflection surface 141 of the single focusing mirror 14, and are reflected. Also, the fast axial A1 direction component of each of the laser beams L from the LDs 11 is focused into a position corresponding to the focal point F according to the principle shown in FIG. 6A. Therefore, a single focusing mirror 14 can focus the laser beams L emitted from the LDs 11 into the position corresponding to the focal point F, that is, into the incident end surface 161a of the core 161 of the optical fiber 16. In addition, in the X-Y plane, the distance between the laser beams L after reflection by the focusing mirror 14 can be narrower than the distance in the X direction between the laser beams L emitted from the respective LDs 11 and traveling in the Y direction. In the present embodiment, the focusing mirror 14 has a shape such that the optical axes La of the reflected laser beams L are, as an average, in the X direction. In other words, the amount of change in the direction of the optical axis La of the laser beam L due to reflection by the focusing mirror 14 is 90 degrees when averaged over the plurality of laser beams L.

Figure 7:
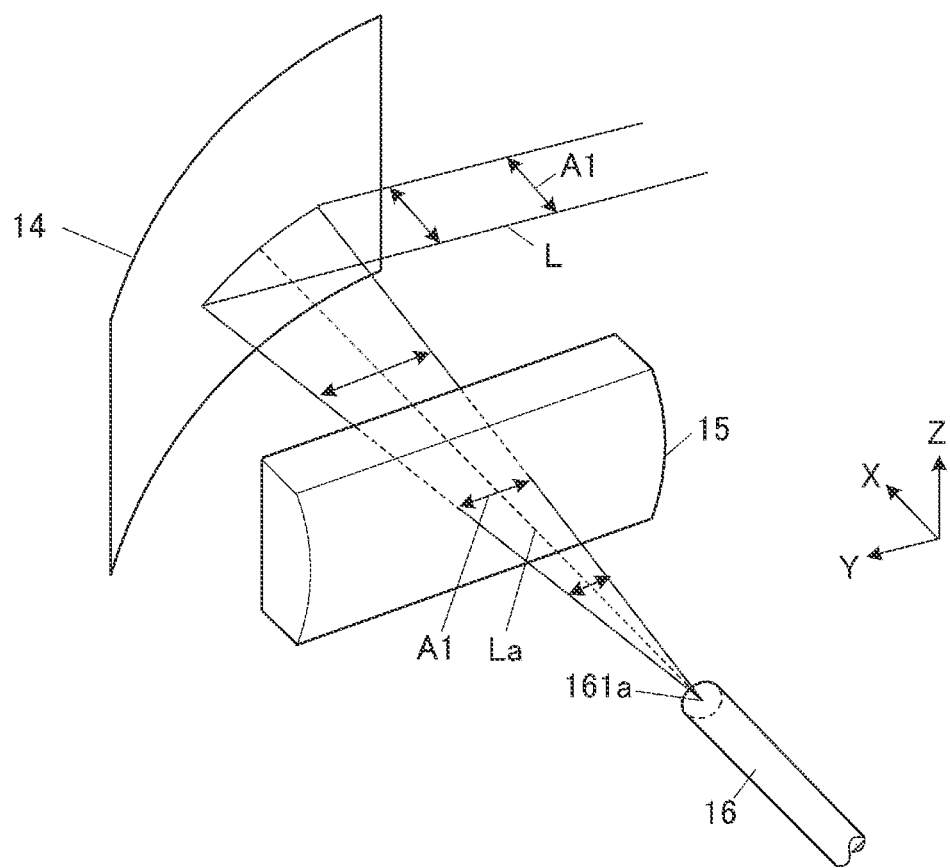
FIG. 7 illustrates a focusing effect in the fast axial direction by the focusing mirror and the focusing lens.
Figure 8:
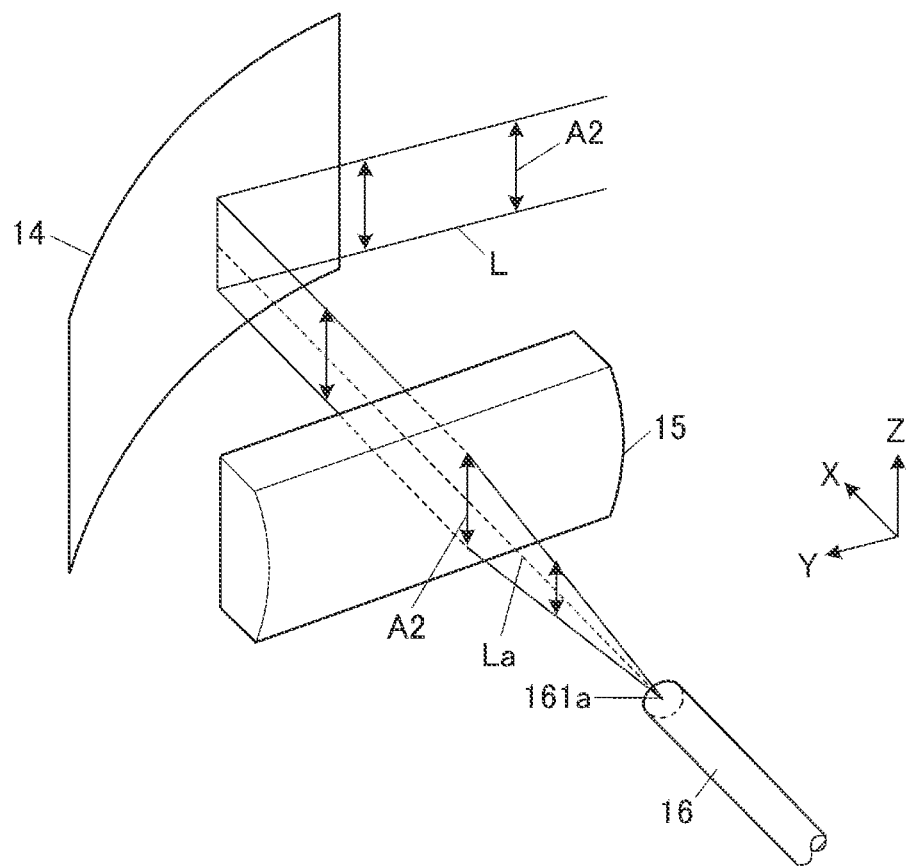
FIG. 8 illustrates a focusing effect in the slow axial direction by the focusing mirror and the focusing lens.

As shown in FIGS. 2, 7, and 8, between the focusing mirror 14 and the optical fiber 16, there is a focusing lens 15 that focuses the laser beam L reflected by the focusing mirror 14 in the slow axial A2 direction. Here, "focusing the laser beam L in the slow axial A2 direction" means focusing the laser beam particularly in the slow axial A2 direction, for example, focusing the laser beam only in the slow axial A2 direction. Here, "focusing the laser beam only in the slow axial A2 direction" means that the focusing lens 15 is designed to focus the laser beam not in the fast axial A1 direction but in the slow axial A2 direction, however, the focusing lens 15 may have a slight focusing effect (refraction effect) in the fast axial A1 direction due to manufacturing variations in the focusing lens 15. The focusing lens 15 is a cylindrical lens having a curvature in the slow axial A2 direction and a cylinder axis in the fast axial A1 direction. The focusing lens 15 refracts the collimated slow axial A2 direction component of the laser beam L reflected by the focusing mirror 14 and focuses it into the position of the incident end surface 161a of the core 161 of the optical fiber 16. Specifically, the focusing lens 15 has a planar incident surface (here, parallel to the Y-Z plane) and an exit surface in the form of a cylindrical surface opposite to the incident surface. The exit surface of the focusing lens 15 is curved so as to have a cross-section parallel to the X-Z plane protruding in the −X direction and a straight cross-section parallel to the X-Y plane. The focusing lens 15 with such a structure focuses the laser beam L in the slow axial A2 direction but does not have the focusing effect on the laser beam L in the fast axial A1 direction. The focusing lens 15 is arranged such that the distance between a predetermined portion in the focusing lens 15 and the optical fiber 16 is the focal length of the focusing lens 15.

FIG. 7 illustrates the focusing effect in the fast axial A1 direction by the focusing mirror 14 and the focusing lens 15. In FIG. 7, the fast axial A1 direction component of the laser beam L is extracted and illustrated. The fast axial A1 direction component of the laser beam L collimated by the first collimator lens 12 and travelling in the Y direction is reflected by the reflection surface 141 of the focusing mirror 14, and is focused so as to be converged at the position of the incident end surface 161a of the core 161 of the optical fiber 16. That is, the beam enters a point on the reflection surface 141, is reflected according to an orientation of the reflection surface 141 at the point, and travels toward the position of the core 161 of the optical fiber 16. The fast axial A1 direction component of the laser beam L reflected by the focusing mirror 14 enters the focusing lens 15, passes through the focusing lens 15 without being focused, and enters the incident end surface 161*a* of the core 161 of the optical fiber 16.

FIG. 8 illustrates the focusing effect in the slow axial A2 direction by the focusing mirror 14 and the focusing lens 15. In FIG. 8, the slow axial A2 direction component of the laser beam L is extracted and illustrated. The slow axial A2 direction component of the laser beam L collimated by the second collimator lens 13 and travelling in the Y direction is reflected by the reflection surface 141 of the focusing mirror 14, and travels to the focusing lens 15. Here, since the reflection surface 141 of the focusing mirror 14 is not curved in the slow axial A2 direction, the slow axial A2 direction component of the laser beam L is reflected while remaining to be a collimated beam. The slow axial A2 direction component of the laser beam L reflected by the focusing mirror 14 enters the focusing lens 15 and is focused so as to be converged at the position of the incident end surface 161*a* of the core 161 of the optical fiber 16.

Effects of Embodiment

The optical system 100 described above is configured such that, for each of the fast axial A1 direction component and the slow axial A2 direction component, the coupling efficiency to the optical fiber 16 can be improved by reducing the incident angle loss and the incident position loss described above. The optical system 100 is also configured such that the increase in the incident angle loss and the incident position loss with respect to the misalignment of the LD 11 (hereinafter referred to as "error sensitivity") can be reduced. These are explained below.
(Effect of Reducing Incident Angle Loss, Incident Position Loss, and Error Sensitivity of Fast Axial Directional Component)

In general, when the beam width of the collimated laser beam L is wider than a certain width, the laser beam L near the edge of the beam in the beam width direction enters the incident end surface 161*a* at an incident angle (focusing angle) larger than the maximum light-receiving angle, which results in an increase in the incident angle loss. In particular, the fast axial A1 direction component of the laser beam L tends to have a wide beam width due to its large divergence angle. However, when the distance between the LD 11 and the first collimator lens 12 in FIGS. 2 and 4 is shortened by using a first collimator lens 12 having a short focal length to reduce the spread of the beam width, the incident angle loss and the incident position loss increase due to slight misalignment of the LD 11, which results in an increase in the error sensitivity.

Therefore, in the optical system 100 of the present embodiment, the focusing mirror 14 that focuses the fast axial A1 direction component is provided separately from the focusing lens 15 that focuses the slow axial A2 direction component, and the focusing mirror 14 is arranged farther from the incident end surface 161*a* of the optical fiber 16 than the focusing lens 15 is. As a result, as shown in FIG. 7, the focusing mirror 14 can focus the beam gently at a small focusing angle. Therefore, even when the beam width in the fast axial A1 direction is widened by increasing the distance between the LD 11 and the first collimator lens 12 to some extent in order to reduce the error sensitivity described above, the incident angle loss can be sufficiently reduced. Therefore, the error sensitivity can be reduced (desensitized) while high coupling efficiency is maintained due to the reduced incident angle loss.

When the focusing angle by the focusing mirror 14 is small, the focusing position tends to vary easily, and the incident position loss tends to increase. However, because the fast axial A1 direction component of the laser beam L has a small variation in the emission direction (high parallelism) due to the small dimension of the luminous end surface 113*a* of the LD 11, the small focusing angle by the focusing mirror 14 is unlikely to result in variation in the focusing position, and the incident position loss can be maintained at a low level.

In this way, according to the optical system 100 of the light source device 10 of the present embodiment, the incident angle loss, the incident position loss, and the error sensitivity can all be reduced to a low level for the fast axial A1 direction component.
(Effect of Reducing Incident Angle Loss, Incident Position Loss, and Error Sensitivity of Slow Axial Direction Component)

The slow axial A2 direction component of the laser beam L has a large variation in the emission direction (low parallelism) due to the large dimension of the luminous end surface 113*a* of the LD 11 in the Y direction. Therefore, by using the second collimator lens 13 for collimating the slow axial A2 direction component having a long focal length, the second collimator lens 13 is arranged farther from the LD 11 than the first collimator lens 12 is. In general, a collimator lens with a longer focal length enhances the parallelism of collimated beam. Therefore, by using the second collimator lens 13 with a long focal length, the slow axial A2 direction component, which has a large variation in emission direction, can be collimated into a collimated beam with higher parallelism.

Also, as shown in FIG. 8, by using the focusing lens 15 having a short focal length for focusing the slow axial A2 direction component, the focusing lens 15 is arranged closer to the incident end surface 161*a* of the core 161 than the focusing mirror 14 is. As a result, the incident angle (focusing angle) at the incident end surface 161*a* of the core 161 is large, and the variation in the focusing position is reduced.

In this way, as a result of using the second collimator lens 13 with a long focal length to enhance the parallelism after collimation and using the focusing lens 15 with a short focal length to reduce the variation in the focusing position, the incident position loss can be reduced for the slow axial A2 direction component, having large variation in the emission direction.

Because the slow axial A2 direction component has a small divergence angle, even when the distance between the LD 11 and the second collimator lens 13 is increased, the beam width of the slow axial A2 direction component having a small divergence angle is less likely to be widened. Therefore, even with a focusing lens 15 with a short focal length, the incident angle near the edge of the beam in the width direction can be reduced to the maximum light-receiving angle or less. Therefore, the incident angle loss can also be reduced to a low level. Also, for the slow axial A2 direction component with a small divergence angle, the increase in the incident angle loss and the incident position loss with respect to the misalignment of the LD 11 can be reduced, and thus the error sensitivity can also be reduced to a low level.

Effect Compared to Comparative Example

Figure 9:
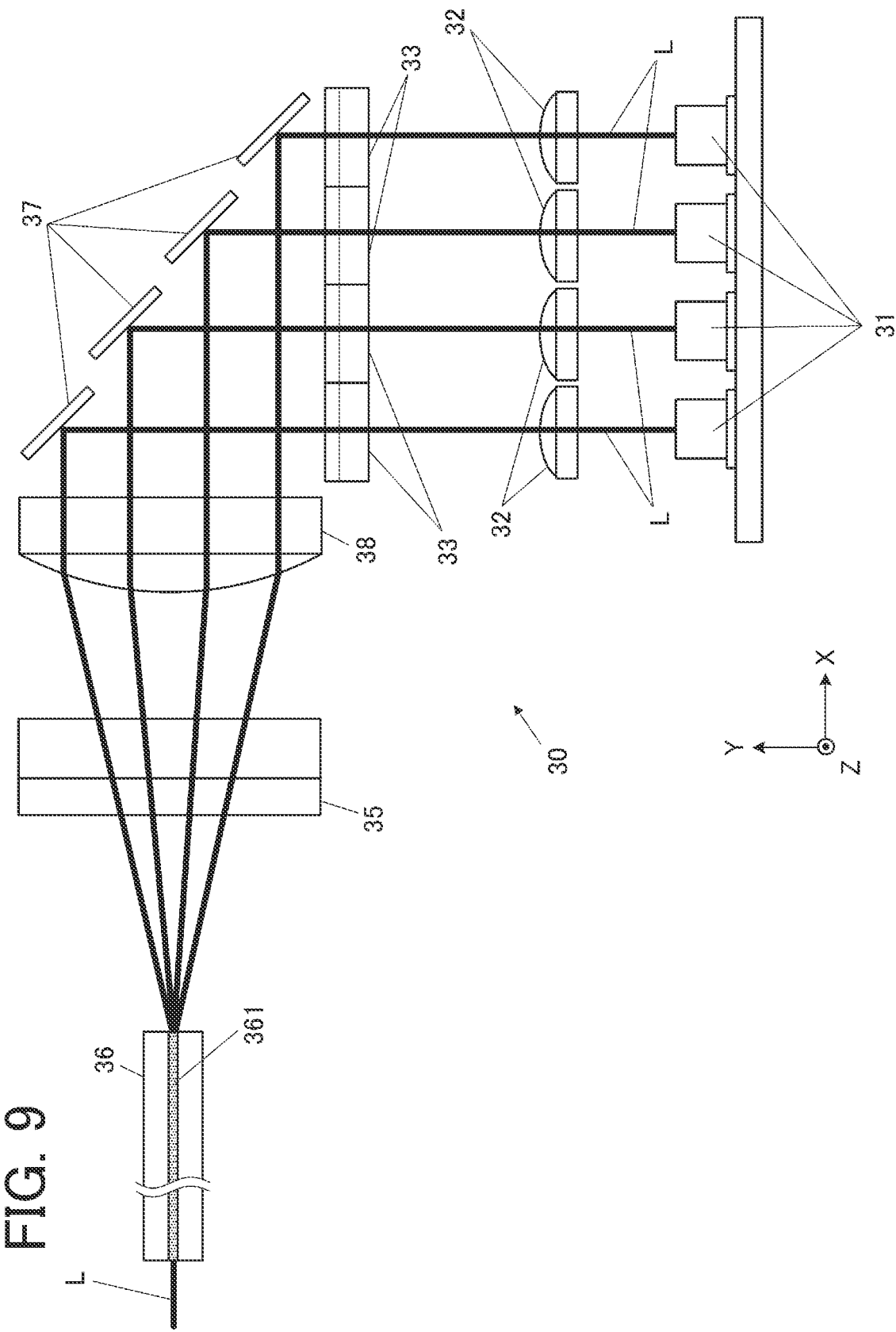
FIG. 9 is a schematic diagram showing a configuration of a light source device according to a comparative example.

Next, the effect of the light source device 10 of the present embodiment compared to the comparative example shown in FIG. 9 will be explained. FIG. 9 shows a configuration of a light source device 30 according to the comparative example. The light source device 30 according to the comparative example includes a plurality of LDs 31, first collimator lenses 32, second collimator lenses 33, a plurality of reflection mirrors 37, a first focusing lens 38, a second focusing lens 35, and an optical fiber 36. Among these, the configurations and functions of the plurality of LDs 31, the first collimator lenses 32, the second collimator lenses 33, the second focusing lens 35, and the optical fiber 36 are respectively the same as those of the plurality of LDs 11, the first collimator lenses 12, the second collimator lenses 13, the focusing lens 15, and the optical fiber 16 of the light source device 10 according to the above embodiment. The light source device 30 according to the comparative example is different from the light source device 10 according to the above embodiment in that the plurality of reflection mirrors 37 is provided instead of the focusing mirror 14, and the first focusing lens 38 is provided between the plurality of reflection mirrors 37 and the second focusing lens 35.

Each of the plurality of reflection mirrors 37 reflects the laser beam L emitted from one of the plurality of LDs 31 in the −X direction. The reflection mirrors 37 are separately provided for the respective LDs 31, such that the distance between the laser beams L after reflection is narrower than the distance between the laser beams L before reflection.

The first focusing lens 38 is a cylindrical lens having a curvature in the fast axial A1 direction and a cylinder axis in the slow axial A2 direction. The first focusing lens 38 refracts the fast axial A1 direction component of the laser beam L reflected by each of the plurality of reflection mirrors 37 and focuses it into the position of the incident end surface 161a of the core 161 of the optical fiber 16.

Even with the light source device 30 according to the comparative example, the laser beam L in the Y direction is reflected to be in the −X direction, and the fast axial A1 direction component and the slow axial A2 direction component can be focused separately and independently. However, it is necessary to provide the plurality of reflection mirrors 37 and, separately from the plurality of reflection mirrors 37, the first focusing lens 38 for focusing the fast axial A1 direction component.

In contrast to the light source device 30 of the comparative example having such a configuration, according to the light source device 10 of the above embodiment, the plurality of reflection mirrors 37 can be integrated into a single mirror, i.e., the focusing mirror 14 having the parabolic columnar surface. Furthermore, since the focusing mirror 14 can focus the fast axial A1 direction component, the first focusing lens 38 can be omitted. Therefore, the configuration of the optical system 100 can be simplified compared to that of the light source device 30 of the comparative example.

As described above, the light source device 10 according to the present embodiment includes the LD(s) 11 that emits the laser beam L having a larger divergence angle in the fast axial A1 direction perpendicular to the optical axis La than a divergence angle in the slow axial A2 direction perpendicular to the optical axis La and the fast axis A1, the focusing mirror 14 that reflects the laser beam L emitted from the LD 11 and focuses the laser beam L in the fast axial A1 direction, the focusing lens 15 that focuses the laser beam L reflected by the focusing mirror 14 in the slow axial A2 direction, and the optical fiber 16 that has the core 161 where the laser beam L focused by the focusing mirror 14 and the focusing lens 15 enters. According to this configuration, since the focusing mirror 14 can reflect the laser beam L while focusing it in the fast axial A1 direction, it is possible to simplify the configuration of the optical system 100 and to downsize the device compared with the light source device 30 according to the comparative example that requires the reflection mirror 37 for reflecting the laser beam L and the first mirror 38 for focusing the fast axial A1 direction component. Further, as the focusing mirror 14 is provided at a position farther from the optical fiber 16 than the focusing lens 15 is, the fast axial A1 component of the laser beam L can be focused more gently than the slow axial A2 direction component. Therefore, even when the beam width in the fast axial A1 direction is increased, the incident angle loss can be sufficiently reduced. Therefore, by increasing the distance between the LD 11 and the first collimator lens 12 (by increasing the focal length of the first collimator lens 12), the error sensitivity with respect to the shift of the LD 11 can be reduced for the fast axial A1 direction component. Also, by providing the focusing lens 15 at a position closer to the optical fiber 16 than the focusing mirror 14, the focal length can be shortened, and the variation in the focusing position can be reduced for the slow axial A2 direction component. Therefore, the incident position loss can be reduced for the slow axial A2 direction component, having a large variation in the emission direction. Therefore, the incident angle loss, the incident position loss, and the error sensitivity can all be reduced to a low level for both the fast axial A1 direction component and the slow axial A2 direction component. As a result, the loss of coupling efficiency to the optical fiber 16 can be reduced, and the device can be downsized.

The focusing mirror 14 has the reflection surface 141 that is the parabolic columnar surface, having the partial parabola shape in the first plane that is parallel to the optical axis La and the fast axis A1 and the linear shape in the second plane that is perpendicular to the first plane. The partial parabola shape corresponds to a portion of a certain hypothetical parabola P in the first plane and does not cross an axis AX of the parabola P. As a result of this, the simply configured focusing mirror 14 can reflect the laser beam L while focusing the fast axial A1 direction component into the focal point F.

The focusing mirror 14 is arranged so that the optical axis La of the laser beam L entering the reflection surface 141 is parallel to the axis AX of the parabola P. The incident end surface 161a of the core 161 of the optical fiber 16 is arranged at a position corresponding to the focal point F of the parabola P when viewed from a direction perpendicular to the first plane. According to such arrangement, the focusing mirror 14 with a simple configuration can both reflect the laser beam L and focus the fast axial A1 direction component into the incident end surface 161a of the core 161 of the optical fiber 16.

The focusing lens 15 is a cylindrical lens having a curvature in the slow axial A2 direction. As a result, the focusing lens 15 can selectively focus the slow axial A2 direction component without focusing the fast axial A2 direction component.

The light source device 10 also includes the plurality of LDs 11 whose positions in the fast axial A1 direction are different from each other. The focusing mirror 14 reflects the laser beams L emitted from the respective LDs 11 and focuses them in the fast axial A1 direction. As a result, one focusing mirror 14 can focus the fast axial A1 direction components of the plurality of laser beams L into the position of the incident end surface 161a of the core 161. Therefore, the device can be effectively downsized compared to the light source device 30 according to the comparative example, in which the reflection mirrors 37 are provided for respective LDs 11.

With the focusing mirror 14 that focuses the laser beam L only in the fast axial A1 direction and the focusing lens 15 that focuses the laser beam L only in the slow axial A2 direction, the fast axial A1 direction component and the slow axial A2 direction component of the laser beam L can be more accurately focused into the focusing position (the incident end surface 161*a* of the core 161*a*). Therefore, the loss of coupling efficiency to the optical fiber 16 can be reduced more effectively.

The light source device 10 further includes the first collimator lens 12 that collimates the laser beam L having been emitted from the LD 11 and before entering the focusing mirror 14 in the fast axial A1 direction and the second collimator lens 13 that collimates the laser beam L having passed through the first collimator lens 12 and before entering the focusing mirror 14 in the slow axial A2 direction. As a result, the laser beam L that diffuses elliptically can be effectively collimated.

The first collimator lens 12 is a cylindrical lens having a curvature in the fast axial A1 direction, and the second collimator lens 13 is a cylindrical lens having a curvature in the slow axial A2 direction. As a result, the first collimator lens 12 can collimate the fast axial A1 direction component without having the collimating effect on the slow axial A2 direction component. The second collimator lens 13 can collimate the slow axial A2 direction component without having the collimating effect on the fast axial A1 direction component.

The projector 1 as a projection device according to the present embodiment includes the light source device 10 described above and the image projector 20 that forms an image using at least the laser beam L transmitted through the optical fiber 16 and projects the image. As a result, as the beam extracted from the emission end surface 161*b* of the optical fiber 16 has a uniform light intensity distribution and small etendue, the projector 1 can be configured simply and highly efficiently.

<Others>

The light source device and the projection device according to the present disclosure are exemplified by, but not limited to, the descriptions in the above embodiment. For example, in the above embodiment, an example where the light source device 10 is used as a light source of the projector 1 is described, but does not intend to limit the present disclosure. The light source device 10 can be used for any application that uses laser beam L transmitted through the optical fiber 16.

In the above embodiment, the light source device 10 having eight LDs 11 arranged in four rows in the X-direction and two rows in the Z-direction is exemplified. However, the arrangement and number of the LDs 11 are not limited thereto, and any number of arrays of LDs 11 may be arranged for each of the X and Z directions. The light source device 10 may have a single LD 11.

In the above embodiment, the LD 11 emits the laser beam L with a cross-section perpendicular to the optical axis La that is an ellipse with two axes, the fast axis as the first axis and the slow axis as the second axis. However, any LD 11 can be used without being limited to the above, as long as it emits a laser beam L whose divergence angle in the first axial direction of the first axis perpendicular to the optical axis La is larger than the divergence angle in the second axial direction of the second axis perpendicular to the optical axis La and the first axis.

It goes without saying that the specific configurations and operations of the components of the light source device 10 and the projection device 1 in the above embodiment can be appropriately modified within a range not departing from the scope of the present invention.

Although several embodiments of the present invention have been described above, the scope of the present invention is not limited to the embodiments described above, but includes the scope of the present invention described in the claims and the scope of their equivalents.

What is claimed is:

1. A light source device comprising:
 a laser diode that emits a laser beam having a divergence angle in a first axial direction of a first axis perpendicular to an optical axis larger than a divergence angle in a second axial direction of a second axis perpendicular to the optical axis and the first axis;
 a focusing mirror that reflects the laser beam emitted from the laser diode and focuses the laser beam in the first axial direction;
 a focusing lens that focuses the laser beam reflected by the focusing mirror in the second axial direction; and
 an optical fiber that has a core that the laser beam focused by the focusing mirror and the focusing lens enters, wherein
 the focusing mirror has a reflection surface that is a parabolic columnar surface, the parabolic columnar surface having a partial parabola shape in a first plane that is parallel to the optical axis and the first axis and a linear shape in a second plane that is perpendicular to the first plane, the partial parabola shape corresponding to a portion of a hypothetical parabola in the first plane and not crossing an axis of the hypothetical parabola,
 the focusing mirror is arranged such that the optical axis of the laser beam entering the reflection surface is parallel to the axis of the parabola, and
 the core of the optical fiber is arranged at a position corresponding to a focal point of the parabola when viewed from a direction perpendicular to the first plane.

2. The light source device according to claim 1, wherein the focusing lens is a cylindrical lens having a curvature in the second axial direction.

3. The light source device according to claim 1, wherein the laser diode includes a plurality of laser diodes whose positions in the first axial direction are different from each other, and
 the focusing mirror reflects the laser beam emitted from each of the laser diodes and focuses the laser beam in the first axial direction.

4. A light source device comprising:
 a laser diode that emits a laser beam having a divergence angle in a first axial direction of a first axis perpendicular to an optical axis larger than a divergence angle in a second axial direction of a second axis perpendicular to the optical axis and the first axis;
 a focusing mirror that reflects the laser beam emitted from the laser diode and focuses the laser beam in the first axial direction;
 a focusing lens that focuses the laser beam reflected by the focusing mirror in the second axial direction; and
 an optical fiber that has a core that the laser beam focused by the focusing mirror and the focusing lens enters, wherein
 the focusing mirror focuses the laser beam only in the first axial direction, and
 the focusing lens focuses the laser beam only in the second axial direction.

5. A light source device comprising:
a laser diode that emits a laser beam having a divergence angle in a first axial direction of a first axis perpendicular to an optical axis larger than a divergence angle in a second axial direction of a second axis perpendicular to the optical axis and the first axis;
a focusing mirror that reflects the laser beam emitted from the laser diode and focuses the laser beam in the first axial direction;
a focusing lens that focuses the laser beam reflected by the focusing mirror in the second axial direction;
an optical fiber that has a core that the laser beam focused by the focusing mirror and the focusing lens enters;
a first collimator lens that collimates the laser beam emitted from the laser diode and before entering the focusing mirror in the first axial direction, and
a second collimator lens that collimates the laser beam having passed through the first collimator lens and before entering the focusing mirror in the second axial direction.

6. The light source device according to claim 5, wherein the focusing mirror has a reflection surface that is a parabolic columnar surface, the parabolic columnar surface having a partial parabola shape in a first plane that is parallel to the optical axis and the first axis and a linear shape in a second plane that is perpendicular to the first plane, the partial parabola shape corresponding to a portion of a hypothetical parabola in the first plane and not crossing an axis of the hypothetical parabola.

7. The light source device according to claim 5, wherein the first collimator lens is a cylindrical lens having a curvature in the first axial direction, and
the second collimator lens is a cylindrical lens having a curvature in the second axial direction.

8. A projection device comprising:
the light source device according to claim 5; and
an image projector that forms an image using at least the laser beam transmitted through the optical fiber and projects the image.

* * * * *